United States Patent [19]

Suzuki

[11] Patent Number: 5,307,061
[45] Date of Patent: Apr. 26, 1994

[54] ABSOLUTE VALUE CIRCUIT

[75] Inventor: Makoto Suzuki, Tokyo, Japan

[73] Assignee: NEC Corporation, Tokyo, Japan

[21] Appl. No.: 947,587

[22] Filed: Sep. 21, 1992

[30] Foreign Application Priority Data

Sep. 19, 1991 [JP] Japan .................... 3-238534

[51] Int. Cl.$^5$ .......................................... H03M 7/00
[52] U.S. Cl. ............................................... 341/93
[58] Field of Search ............... 341/93, 50; 364/715.01, 364/736, 748

[56] References Cited

U.S. PATENT DOCUMENTS 3,731,152  5/1973  Rockefeller ............. 361/80
4,709,226  11/1987  Christopher ............. 341/93

Primary Examiner—Brian K. Young
Attorney, Agent, or Firm—Sughrue, Mion, Zinn, Macpeak & Seas

[57] ABSTRACT

An absolute value circuit comprises a first "1" bit detecting unit for sequentially searching input binary data from the least significant bit toward the most significant bit so as to detect a first "1" bit whose value first becomes "1", and a sign discriminating unit for discriminating the polarity of the input binary data. When the input binary data is positive, a data processing unit outputs the input binary data without modification. When the input binary data is negative, the data processing unit outputs data composed of bits from the least significant bit of the input binary data to the first "1" bit detected by the first "1" bit detecting unit, and an inverted bit or bits of a bit or bits of the input binary data more significant than the first "1" bit.

3 Claims, 3 Drawing Sheets

ABSOLUTE VALUE CIRCUIT

BACKGROUND OF THE INVENTION

1. Field of the Invention

The present invention relates to an absolute value circuit, and more specifically an absolute value circuit for use in a digital signal processing circuit for converting N-bit data expressed in the form of a 2's complement into an absolute value data (N is positive integer).

2. Description of Related Art

One of typical conventional absolute value circuit has been fundamentally composed of a data inverting circuit, an adding circuit and a data selection circuit.

N-bit data expressed in a 2's complement is inputted to the data inverting circuit and one input of the data selection circuit. The input data supplied to the data inverting circuit is inverted in all bits, and an inverted data is supplied to the adding circuit, where "1" is added to the least significant bit of the inverted data. The result of addition is supplied to the other input of the data selection circuit.

Thus, because of the characteristics of the N-bit data expressed in a 2's complement, converted data which is a negative number of the input data can be obtained by inverting all bits of the input data and adding "1" to the least significant bit of the inverted data.

A relation between the input data and the converted data is that the converted data is ceaselessly a negative number of the input data, which can be exemplified in such an example that if the input data is +5, the converted data is −5, and if the input data is −5, the converted data is +5.

As mentioned above, the input data and the converted data are supplied to the data selection circuit. Namely, positive data and negative data of a given value supplied as the input data are necessarily supplied to the selection circuit. In addition, whether the input data is positive data or negative data is discriminated on the basis of whether the most significant bit of the input data (namely, the sign bit of the 2's compliment) is "1" or "0". Therefore, the most significant bit of the input data is applied to an control input of the data selection circuit, so that the data selection circuit selects either the input data or the converted data, whereby a positive data is ceaselessly outputted. Thus, the input data is converted into an absolute value data. Namely, an absolute value circuit can be realized.

In the above mentioned absolute value circuit, the data inverting circuit is a conventional inverter circuit of N bits corresponding to the number of bits of an input data, the inverter circuit operating to inverting each bit of the input N-bit data in such a manner that "1" is converted into "0" and "0" is converted into "1".

As the adding circuit and the data selection circuit, "The Bipolar Digital Integrated Circuits Data Book PART 1" published by Japanese Texas Instruments Corporation in 1981 discloses specific examples, and therefore, it is here referred to. A specific circuit example of the adding circuit is disclosed on Page 7–42 of the data book, in which a 4-bit adding circuit is composed of 36 gate circuits. In addition, a specific circuit example of the data selection circuit is disclosed on Page 7–170 of the data book, in which a 4-bit data selection is formed of 15 gate circuits.

However, the adding circuit and the data selection circuit of the above mentioned prior art absolute value circuit should be considered to have a bit structure corresponding to the N-bit input data.

In the conventional absolute value circuit as mentioned above, assuming that the input data is of 4 bits, four inverters (gate circuits) are required for the data inverting circuit, and 36 gate circuits and 15 gate circuits are required for the adding circuit and the data selection circuit, respectively. Namely, 55 gate circuits are required in total.

As mentioned above, the conventional absolute value circuit is complicated in circuit construction and large in circuit scale.

SUMMARY OF THE INVENTION

Accordingly, it is an object of the present invention to provide a absolute value circuit which has overcome the above mentioned defect of the conventional one.

Another object of the present invention is to provide a absolute value circuit which is simple in circuit construction and small in circuit scale.

The above and other objects of the present invention are achieved in accordance with the present invention by an absolute value circuit for converting N-bit data expressed in the form of a 2's complement (N is positive integer) into an absolute value data, comprising a first "1" bit detecting unit directly or indirectly receiving the N-bit data and sequentially searching the N-bit data from the least significant bit toward the most significant bit so as to detect a first "1" bit whose value first becomes "1"; a sign discriminating unit receiving the N-bit data for discriminating the polarity of the N-bit data; and data processing unit directly or indirectly receiving the N-bit data and an output of the sign discriminating unit for outputting the N-bit data without modification when the sign discriminating unit discriminates that the N-bit data is positive, the data processing unit also operating, when the sign discriminating unit discriminates that the N-bit data is negative, to output data composed of bits from the least significant bit of the N-bit data to the first "1" bit detected by the first "1" bit detecting unit, and an inverted bit or bits of a bit or bits of the N-bit data more significant than the first "1" bit.

Assuming that the N-bit data is composed of bits "$b_1$" to "$b_N$" where "$b_1$" is the most significant bit and "$b_N$" is the least significant bit, and the absolute value data is composed of bits "$B_1$" to "$B_N$" in the form of a 2's complement where "$B_1$" is the most significant bit and "$B_N$" is the least significant bit, the least significant bit "$b_N$" of the N-bit data is outputted as the least significant bit "$B_N$" of the absolute value data.

In a preferred embodiment, the first "1" bit detecting unit includes a first OR gate receiving the least significant bit "$b_N$" of the N-bit data and a second least significant bit "$b_{(N-1)}$" of the N-bit data more significant than the least significant bit "$b_N$" by one digit, and a second OR gate receiving an output of the first OR gate and a third least significant bit "$b_{(N-2)}$" of the N-bit data more significant than the second least significant bit "$b_{(N-1)}$" by one digit. The sign discriminating unit includes a first AND gate receiving the least significant bit "$b_N$" and the most significant bit "$b_1$" of the N-bit data, a second AND gate receiving the output of the first OR gate and the most significant bit "$b_1$" of the N-bit data, and a third AND gate receiving an output of the second OR gate and the most significant bit "$b_1$" of the N-bit data. The data processing unit includes a first exclusive-OR gate, receiving the second least significant bit "$b_{(N-1)}$" of the N-bit data and an output of the first AND gate, for outputting a second least significant bit "$B_{(N-1)}$" of the absolute value data more significant than the least significant bit "$B_N$" of the absolute value data by one digit, a second exclusive-OR gate, receiving the third least significant bit "$b_{(N-2)}$" of the N-bit data and an output of the second AND gate, for outputting a third least significant bit "$B_{(N-2)}$" of the absolute value data more significant than the second least significant bit "$B_{(N-1)}$" of the absolute value data by one digit, and a third exclusive-OR gate, receiving a fourth least significant bit "$b_{(N-3)}$" of the N-bit data more significant than the third least significant bit "$b_{(N-2)}$" by one digit, and an output of the third AND gate, for outputting a fourth least significant bit "$B_{(N-3)}$" of the absolute value data more significant than the third significant bit "$B_{(N-2)}$" of the absolute value data by one digit.

In another preferred embodiment, The sign discriminating unit includes a first exclusive-OR gate receiving the most significant bit "$b_1$" and the least significant bit "$b_N$" of the N-bit data, a second exclusive-OR gate receiving the most significant bit "$b_1$" of the N-bit data and a second least significant bit "$b_{(N-1)}$" more significant than the least significant bit "$b_N$" by one digit, and a third exclusive-OR gate receiving the most significant bit "$b_1$" of the N-bit data and a third least significant bit "$b_{(N-2)}$" more significant than the second least significant bit "$b_{(N-1)}$" by one digit. The first "1" bit detecting unit includes a first AND gate receiving the most significant bit "$b_1$" of the N-bit data and an output of the first exclusive-OR gate, a second AND gate receiving an output of the first AND gate and an output of the second exclusive-OR gate, and a third AND gate receiving an output of the second AND gate and an output of the third exclusive-OR gate. The data processing unit includes a fourth exclusive-OR gate, receiving the output of the second exclusive-OR gate and the output of the first AND gate, for outputting a second least significant bit "$B_{(N-1)}$" of the absolute value data more significant than the least significant bit "$B_N$" of the absolute value data by one digit, and a fifth exclusive-OR gate, receiving the output of the third exclusive-OR gate and the output of the second AND gate, for outputting a third least significant bit "$B_{(N-2)}$" of the absolute value data more significant than the second least significant bit "$B_{(N-1)}$" of the absolute value data by one digit, an output of the third AND gate outputting a fourth least significant bit "$B_{(N-2)}$" of the absolute value data more significant than the third least significant bit "$B_{(N-2)}$" of the absolute value data by one digit.

The above and other objects, features and advantages of the present invention will be apparent from the following description of preferred embodiments of the invention with reference to the accompanying drawings.

DESCRIPTION OF THE PREFERRED EMBODIMENTS

Figure 1:
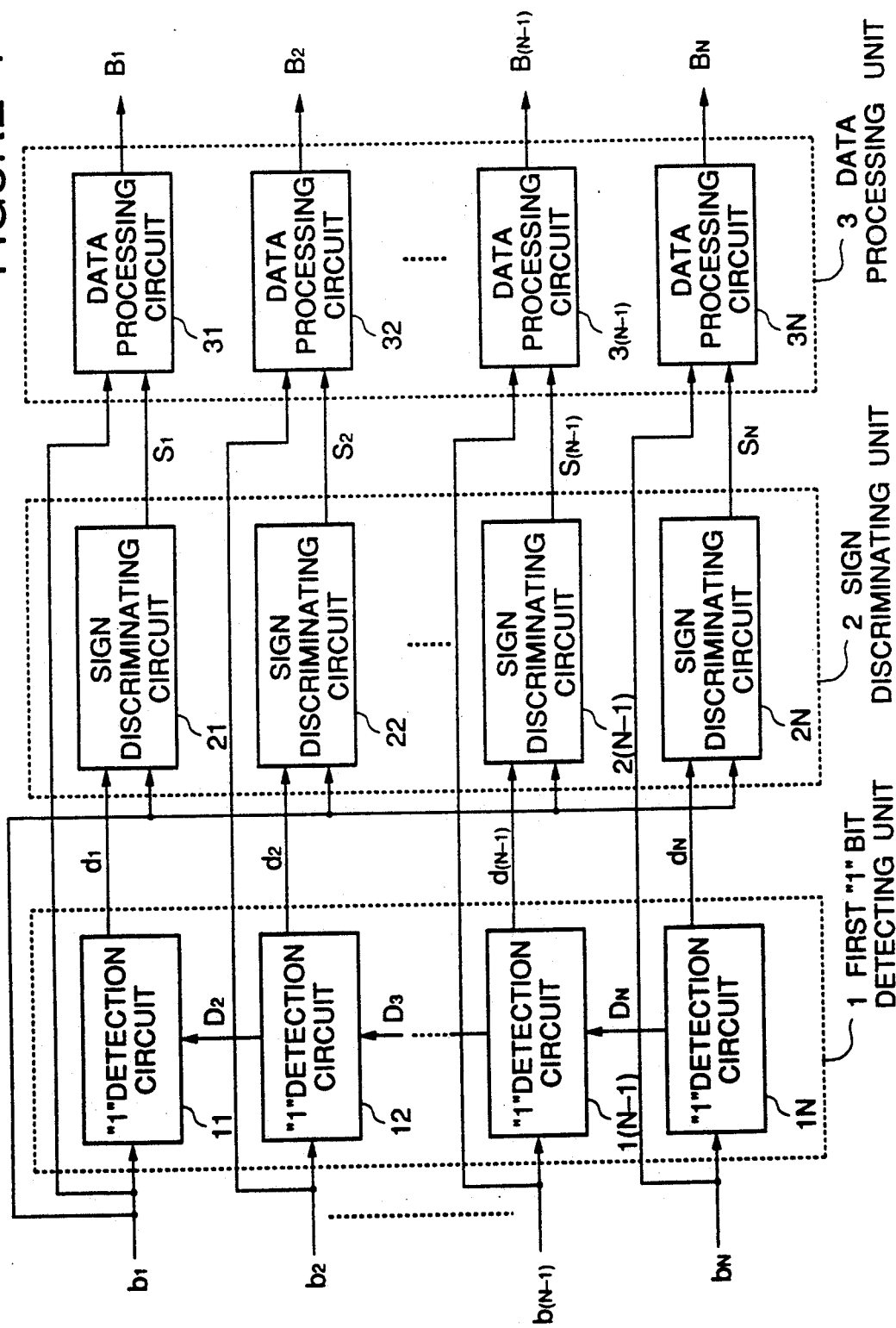
FIG. 1 is a block diagram of a first embodiment of the absolute value circuit in accordance with the present invention.

Referring to FIG. 1, there is shown a block diagram of a first embodiment of the absolute value circuit in accordance with the present invention.

The absolute value circuit in accordance with the present invention as shown in FIG. 1 includes a first "1" bit detecting unit 1 receiving input data of N bits "$b_1$" to "$b_N$", and sequentially searching the N-bit input data from the least significant bit "$b_N$" toward the most significant bit "$b_1$" so as to detect a first "1" bit whose value first becomes "1", a sign discriminating unit 2 receiving the N-bit data for discriminating the polarity of the N-bit input data, and a data processing unit 3.

The first "1" bit detecting unit 1 includes "N" of "1" detection circuits 11 to 1N each receiving a corresponding one bit of the N-bit input data for discriminating whether the received one bit is "1" or not.

The sign discriminating unit 2 includes "N" of sign discriminating circuits 21 to 2N provided in correspondence to the N bits "$b_1$" to "$b_N$" of the input data. Each of the sign discriminating circuits 21 to 2N receives the most significant bit "$b_1$" of the N bit input data and an output of a corresponding "1" detection circuit of the first "1" bit detecting unit 1.

The data processing unit 3 receives the N-bit input data and an output of the sign discriminating unit 2 and outputs the N-bit input data without modification when the sign discriminating unit discriminates that the N-bit data is positive. When the sign discriminating unit 2 discriminates that the N-bit data is negative, the data processing unit 3 also outputs data composed of bits from the least significant bit of the N-bit input data to the first "1" bit, and an inverted bit or bits of a bit or bits of the N-bit input data more significant than the first "1" bit. The data processing unit 3 is composed of "N" data processing circuits 31 to 3N provided in correspondence to the N bits "$b_1$" to "$b_N$" of the input data.

Now, operation of the first embodiment will be described.

Assume that data of N bits expressed in a 2's complement is supplied as input bits "$b_1$" to "$b_N$" of the absolute value circuit shown in FIG. 1. The input data bits "$b_1$" to "$b_N$" are supplied to both of the first "1" bit detection unit 1 and the data processing unit 3.

The input data bits "$b_1$" to "$b_N$" inputted into the first "1" bit detection unit 1 are supplied to the "1" detection circuits 11 to 1N for the purpose of detection of "1" in each bit of the input data bits "$b_1$" to "$b_N$". This detection of "1" is sequentially scanned from the least significant bit "$b_N$" to the most significant bit "$b_1$". Now, assuming that the value of the input bit "$b_{(N-1)}$" is a first "1" and the value of the input bit "$b_N$" less significant than the input bit "$b_{(N-1)}$" is "0", the "1" detection circuit 1N receiving the input bit "$b_N$" outputs a signal $D_N$ indicating that "1" is not detected, to the "1" detection circuit 1(N−1) for a bit more significant than that of the "1" detection circuit 1N.

On the other hand, the "1" detection circuit 1(N−1) receiving the input bit "$b_{(N-1)}$" outputs a signal $D_{(N-1)}$ indicating that "1" is detected, to the "1" detection circuit 1(N−2) for a bit more significant than that of the "1" detection circuit 1(N−1).

If each "1" detection circuit receives a signal indicating that "1" is detected, from an adjacent "1" detection circuit for a less significant bit, the "1" detection circuit outputs a signal indicating that "1" is detected in a less significant bit, to an adjacent "1" detection circuit for a more significant bit.

In addition, the "1" detection circuit 1(N−1) generates an active signal $d_{(N-1)}$ indicating that "1" is firstly detected, which is supplied to a corresponding sign discriminating circuit 2(N−1) of the sign discriminating unit 2. The "1" detection circuits such as 11 and 12 for bits more significant than the input bit "$b_{(N-1)}$" of the first "1" is controlled by the "1" detection signals $D_2$ and $D_3$ from the "1" detection circuits for the less significant bit, regardless of whether the corresponding input bit "$b_1$" and "$b_2$" is "1" or "0". Therefore, each of the "1" detection circuits 11 and 12 supplies a signal "$d_1$" or "$d_2$" indicating that "1" is detected in a less significant bit, to a corresponding sign discriminating circuit 21 or 22 of the sign discriminating unit 2.

In order to discriminate the polarity of the input data, the sign discriminating unit 2 receives the most significant bit indicating whether or the N-bit input data expressed in the 2's complement is positive or negative. Namely, the sign discriminating unit 2 receives the input bit "$b_1$" which is a sign bit of the 2's complement data. The input bit "$b_1$" is supplied to all the sign discriminating circuits 21 to 2N.

If the input bit "$b_1$" is "0", the N-bit input data is positive in polarity. In this case, all the sign discriminating circuits 21 to 2N, receiving the input bit "$b_1$" indicating that the N-bit input data is positive, supply signals $S_1$ to $S_N$ indicating that the N-bit input data is positive, to corresponding data processing circuits 31 to 3N of the data processing unit 3, respectively.

When the data processing circuits 31 to 3N receive the signals $S_1$ to $S_N$ indicating that the N-bit input data is positive, the data processing circuits 31 to 3N output the input bits "$b_1$" to "$b_N$" without modification, as bits $B_1$ to $B_N$ of the absolute data.

If the input bit "$b_1$" is "1", the N-bit input data is negative in polarity. In this case, the output signals $S_1$ to $S_N$ of the sign discriminating circuits 21 to 2N are controlled as follows by the output signals "$d_1$" to "$d_N$" of the "1" detection circuits 11 to 1N of the first "1" bit detection unit 1:

The sign discriminating circuit 2N outputs to the data processing circuit 3N the signal SN indicating that the N-bit input data is negative and "1" is not detected in the input bit "$b_N$". As a result, the data processing circuit 3N outputs the input bit "$b_N$" as a bit $B_N$ of the absolute data.

The sign discriminating circuit 2(N−1) outputs to the data processing circuit 3(N−1) the signal S(N−1) indicating that the N-bit input data is negative and "1" is firstly detected in the input bit "$b_{(N-1)}$". As a result, the data processing circuit 3(N−1) outputs the input bit "$b_{(N-1)}$" as a bit $B_{(N-1)}$ of the absolute data.

The sign discriminating circuits 21 to 2(N−2) in correspondence to the input bits "$b_1$" to "$b_{(N-2)}$", outputs to the data processing circuits 31 to 3(N−2) the signals S1 to S(N−2) indicating that the N-bit input data is negative and "1" is already detected in the input bit less significant than the input bits "$b_1$" to "$b_{(N-2)}$". As a result, the data processing circuit 31 to 3(N−2) outputs inverted bits of the input bits "$b_1$" to "$b_{(N-2)}$" as bits $B_1$ to $B_{(N-2)}$ of the absolute data.

With the above mentioned arrangement, when the N-bit data in the form of 2's complement is inputted to the absolute value circuit, if the most significant bit indicating the polarity of the data is "0", namely, if the data is positive, the input data is outputted as it is. To the contrary, if the most significant bit indicating the polarity of the data is "1", namely, if the data is negative, "1" is searched from the least significant bit of the input data, and data composed of the least significant bit to the first "1" bit of the input data and an inverted bit or bits of a bit or bits of the input data more significant than the first "1" bit is outputted as an absolute value of the N-bit input data.

Figure 2:
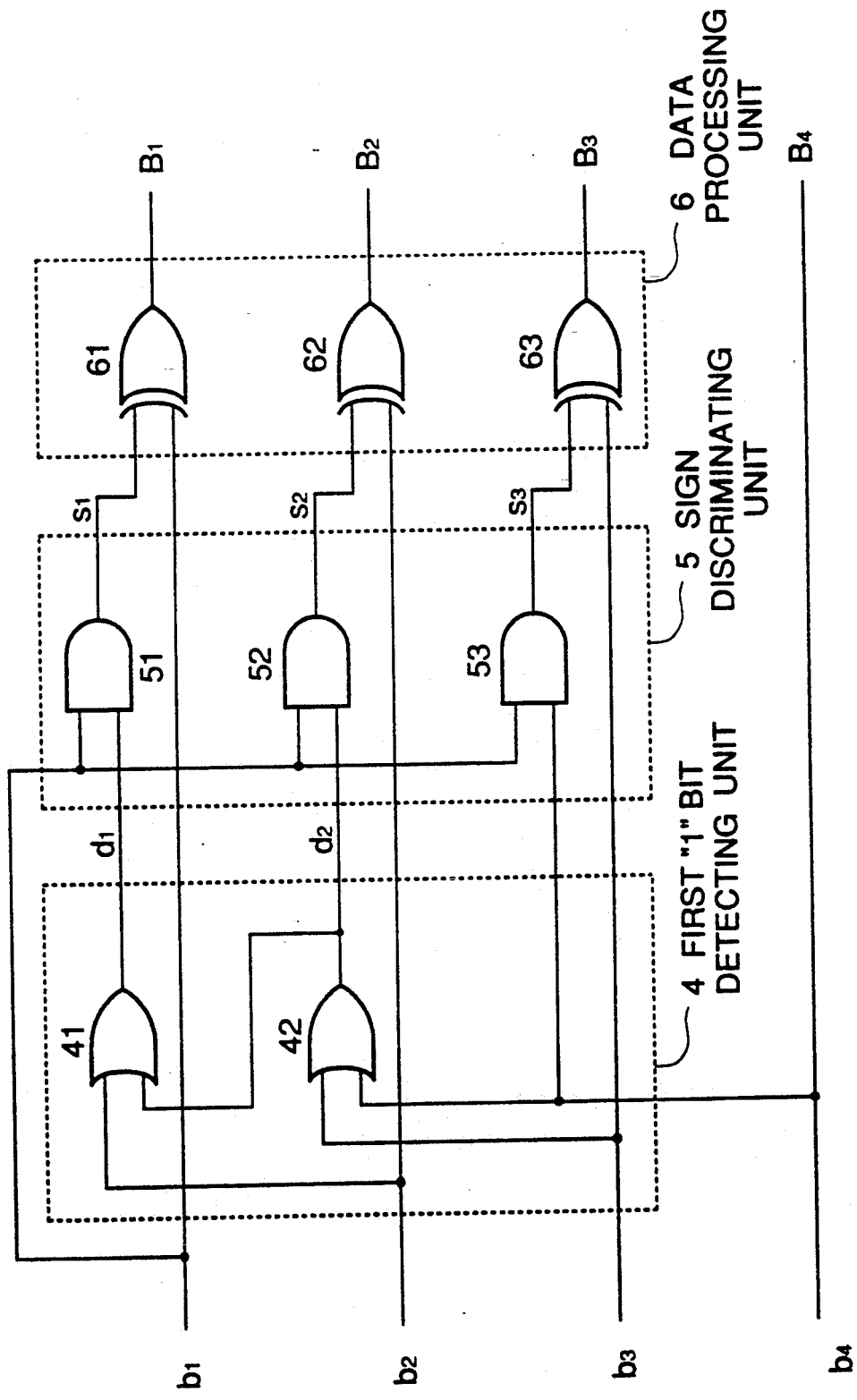
FIG. 2 is a logic block diagram of one embodiment of a 4-bit absolute value circuit in accordance with the present invention.

Referring to FIG. 2, there is shown a logic block diagram of a second embodiment of the absolute value circuit in accordance with the present invention.

The shown second embodiment is a specific example of a 4-bit absolute value circuit in accordance with the first embodiment. This 4-bit absolute value circuit includes a first "1" bit detection unit 4, a sign discriminating unit 5 and a data processing unit 6.

The first "1" bit detection unit 4 includes two OR gates 41 and 42, and the sign discriminating unit 5 includes three AND gates 51, 52 and 53. The data processing unit 6 includes three exclusive-OR gates 61, 62 and 63.

The most significant bit "$b_1$", which indicates the polarity of the input data, is connected to a first input of each of the AND gates 51, 52 and 53 of the sign discriminating unit 5.

The least significant bit "$b_4$" of the input data is directly outputted as the least significant bit "$B_4$" of the output absolute value data. In addition, the least significant bit "$b_4$" of the input data is coupled to a first input of the OR gate 42 and a second input of the AND gate 53.

A second least significant bit "$b_3$" of the input data more significant than the least significant bit "$b_4$" by one digit, is connected to a first input of the exclusive OR gate 63, which has a second input connected to an output of the AND gate 53. An output of the exclusive OR gate 63 is supplied as a second least significant bit "$B_3$" of the output absolute value data more significant than the least significant bit "$B_4$". The second least significant bit "$b_3$" of the input data is also connected to a second input of the OR gate 42, which, in turn, has an output connected to a second input of the AND gate 52.

A third least significant bit "$b_2$" of the input data more significant than the second least significant bit "$b_3$" by one digit, is connected to a first input of the exclusive OR gate 62, which has a second input connected to an output of the AND gate 52. An output of the exclusive OR gate 62 is supplied as the bit "$B_2$" of the output absolute value data more significant than the second least significant bit "$B_3$" by one digit. The bit "$b_2$" of the input data is also connected to a second input of the OR gate 41, which, in turn, has its second input connected to the output of the OR gate 42. An output of the OR gate 41 is connected to a second input of the AND gate 51.

The most significant bit "$b_1$" of the input data is connected to a first input of the exclusive OR gate 61, which has a second input connected to an output of the AND gate 51. An output of the exclusive OR gate 61 is supplied as the most significant bit "$B_1$" of the output absolute value data.

Now, operation of the 4-bit absolute value circuit will be described.

If the input bits "$b_1$" to "$b_4$" of the 4-bit data expressed in the form of a 2's complement are supplied, the OR gate 42 detects whether or not the input data bits "$b_4$" and "$b_3$" are "1". The result of this detection is outputted from the OR gate 42 as a signal "$d_2$". On the other hand, the OR gate 41 receives the signal signal "$d_2$" outputted from the OR gate 42 and the input data bit "$b_2$" and detects whether or not the input data bits "$b_4$", "$b_3$" and "$b_2$" are "1". The result of this detection is outputted from the OR gate 41 as a signal "$d_1$". Now, assuming that the input data bits less significant than the input data bits "$b_2$" is "1", the OR gate 41 outputs the signal "$d_1$" of "1", and the OR gate 42 outputs the signal "$d_2$" of "1".

Since the first input of each of the AND gates 51, 52 and 53 is connected to receive the most significant bit "$b_1$" of the input data, if the input data is positive, namely, if the input data bit "$b_1$" is "0", all the AND gates 51, 52 and 53 output the signals "$S_1$", "$S_2$" and "$S_3$" of "0", respectively. Here, the signals "$S_1$", "$S_2$" and "$S_3$" of "0" means to instruct the data processing unit 6 so as to output its received signal without modification.

On the other hand, if the input data is negative, namely, if the input data bit "$b_1$" is "1", since "1" is supplied to the first input of each of the AND gates 51, 52 and 53, the AND gates 51, 52 and 53 outputs signal received at their second input without modification. Namely, the AND gate 51 supplies as its output signal $S_1$ the signal "$d_1$" of the OR gate 41 in the first "1" bit detection unit 4. Similarly, the AND gate 52 supplies as its output signal $S_2$ the signal "$d_2$" of the OR gate 42 in the first "1" bit detection unit 4. The AND gate 53 supplies as its output signal $S_3$ the input data signal "$b_4$". Namely, the least significant bit input signal "$b_4$" is used as a first "1" bit detection signal at a digit position less significant than that of the AND gate 53.

As mentioned above, the exclusive OR gates 61, 62 to 63 in the data processing unit 6 receive the input data bits "$b_1$", "$b_2$" and "$b_3$" and the output signals "$S_1$", "$S_2$" and "$S_3$" of the sign discriminating unit 5, respectively. Therefore, if the result of discrimination performed in the sign discriminating unit 5 is positive, since the signals "$S_1$", "$S_2$" and "$S_3$" of all the AND gates 51, 52 and 53 become "0", the input data bits "$b_1$", "$b_2$" and "$b_3$" are outputted without modification from the outputs "$B_1$", "$B_2$" and "$B_3$" of the exclusive-OR gates 61, 62 and 63, as the corresponding bits of the absolute value data, respectively.

If the input data bit "$b_1$" is "1", the AND gates 51 to 53 of the sign discriminating unit 5 are brought into an open condition. Therefore, the output "$S_1$" of the AND gate 51 supplies the output "$d_1$" of OR gate 41 of the first "1" bit detection unit 4 without modification. The output "$S_2$" of the AND gate 52 supplies the output "$d_2$" of OR gate 42 of the first "1" bit detection unit 4 without modification, and the output "$S_3$" of the AND gate 53 supplies the input data bit "$b_4$" without modification.

Namely, the exclusive-OR gates corresponding to the least significant bit of the input data bits "$b_1$", "$b_2$" and "$b_3$" of the 4-bit input data to the bit position where "1" first appears by searching from the least significant bit, will receive "0" at their one input, and therefore, outputs the corresponding bits of the 4-bit input data without modification. However, since the exclusive-OR gates corresponding to the bit position(s) more significant than the bit position where "1" first appears by searching from the least significant bit, will receive "1" at their one input, and therefore, outputs an inverted signal of the input data bit received at their other input.

With the above mentioned arrangement and operation, the absolute value bit signals "$B_1$" to "$B_4$" of the input data bits "$b_1$", "$b_2$", "$b_3$" and "$b_4$" of the 4-bit input data are outputted. Here, since the least significant bit "$B_4$" of the absolute value data is the same as the least significant bit "$b_4$" of the input data, regardless of whether the input data is positive or negative, the least significant bit "$b_4$" of the input data is outputted without modification as the least significant bit "$B_4$" of the absolute value data.

The embodiment of the 4-bit absolute value circuit in accordance with the present invention has been described with reference to the drawings. However, in order to expand the bit length, it is sufficient if a unitary circuit composed of the OR gate 42 of the first "1" bit detection unit 4, the AND gate 52 of the sign discriminating unit 5 and the exclusive-OR gate 62 of the data processing unit 6 is added in the number of expanded bits.

Figure 3:
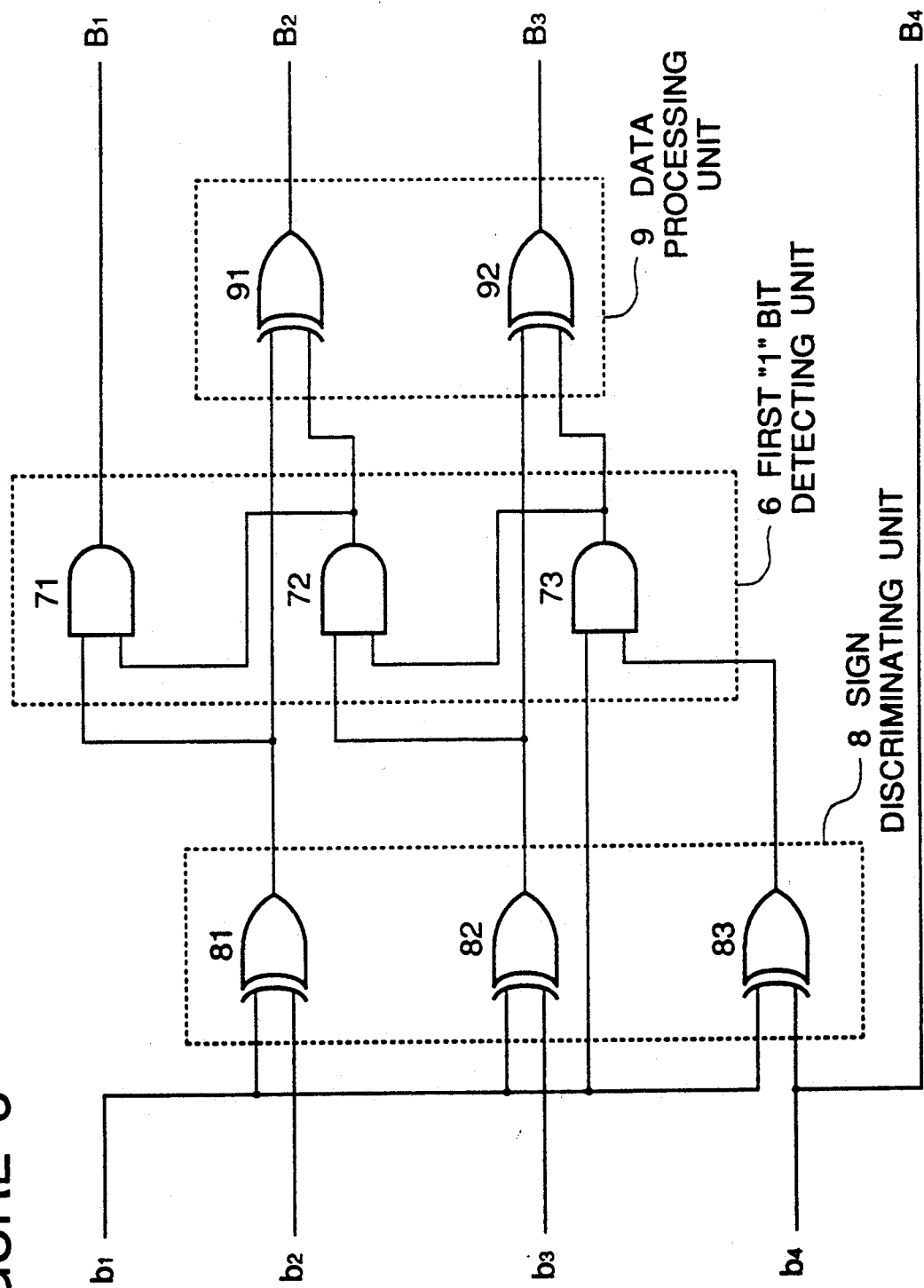
FIG. 3 is a logic block diagram of another embodiment of the 4-bit absolute value circuit in accordance with the present invention.

Turning to FIG. 3, there is shown a logic block diagram of a third embodiment of the absolute value circuit in accordance with the present invention. The absolute value circuit shown in FIG. 3 is different from the absolute value circuit shown in FIG. 2, in which a first "1" bit detecting unit 7 composed of AND gates 71 to 73 is substituted for the first "1" bit detecting unit 4; a sign discriminating unit 8 composed of exclusive-OR gates 81 to 83 is substituted for the sign discriminating unit 5; and a data processing unit 9 composed of exclusive-OR gates 92 and 92 is substituted for the data processing unit 6.

More specifically, the most significant bit "$b_1$" (sign bit) of the input data is connected to a first input of each of the exclusive-OR gates 81 to 83, and a second input of the exclusive-OR gates 81 to 83 are connected to receive the other bits "$b_2$", "$b_3$" and "$b_4$" of the input data, respectively.

An output of the exclusive-OR gate 83 is connected to a first input of the AND gate 73, which has its second input connected to receive the most significant bit "$b_1$" of the input data. An output of the AND gate 73 is connected to a first input of the exclusive-OR gate 92, which has its second input connected to an output of the exclusive-OR gate 82. An output of the exclusive-OR gate 92 supplies the bit "$B_3$" of the absolute value output.

The output of the exclusive-OR gate 82 is connected to a first input of the AND gate 72, which has its second input connected to the output of the AND gate 73. An output of the AND gate 72 is connected to a first input of the exclusive-OR gate 91, which has its second input connected to an output of the exclusive-OR gate 81. An output of the exclusive-OR gate 91 supplies the bit "$B_2$" of the absolute value output.

The output of the exclusive-OR gate 81 is connected to a first input of the AND gate 71, which has its second input connected to the output of the AND gate 72. An output of the AND gate 71 supplies the most significant bit "$B_1$" of the absolute value output.

The above mentioned absolute value circuit shown in FIG. 3 operates fundamentally similarly to the absolute value circuit shown in FIG. 2, excluding difference in a detailed operation due to difference in logic elements, and therefore, explanation of the operation of the absolute value circuit shown in FIG. 3 will be omitted for simplification of description.

As seen from the above, the absolute value circuit in accordance with the present invention is characterized in that it is comprises a first "1" bit detecting unit for sequentially searching input binary data from the least significant bit to the most significant bit so as to detect a first bit whose value first becomes "1"; a sign discriminating unit for discriminating the polarity of the input binary data; and data processing unit for outputting the input binary data without modification when the result of discrimination shows that the input binary data is positive, the data processing unit also operating, when the result of discrimination shows that the input binary data is negative, to output data composed of a bit or bits from the least significant bit of the input binary data to the first "1" bit detected by the first "1" bit detecting unit, and an inverted bit or bits of a bit or bits of the input binary data more significant than the first "1" bit. Thus, the absolute value circuit can be constructed with a simple circuit construction and a reduced scale of circuit.

The invention has thus been shown and described with reference to the specific embodiments. However, it should be noted that the present invention is in no way limited to the details of the illustrated structures but changes and modifications may be made within the scope of the appended claims.

I claim:

1. An absolute value circuit for converting N-bit data expressed in the form of a 2's complement (N is positive integer) into an absolute value data, comprising a first "1" bit detecting unit receiving said N-bit data and sequentially searching said N-bit data from the least significant bit toward the most significant bit so as to detect a first occurring "1" bit in said N-bit data; a sign discriminating unit receiving said N-bit data for discriminating the polarity of said N-bit data; and a processing unit receiving said N-bit data and an output of said sign discriminating unit for outputting said N-bit data without modification when said sign discriminating unit discriminates that said N-bit data is positive, said data processing unit also operating, when said sign discriminating unit discriminates that said N-bit data is negative, to output data composed of bits from the least significant bit of said N-bit data to said first occurring "1" bit detected by said first "1" bit detecting unit, and an inverted bit or bits of a bit or bits of said N-bit data more significant than said first occurring "1" bit.

2. An absolute value circuit claimed in claim 1 wherein said N-bit data is composed of bits "$b_1$" to "$b_N$" is the most significant bit and "$b_N$" is the least significant bit, and said absolute value data is composed of bits "$B_1$" to "$B_N$" in the form of a 2's complement where "$B_1$" is the most significant bit and "$B_N$" is the least significant bit, the least significant bit "$b_N$" of said N-bit data being outputted as the least significant bit "$B_N$" of said absolute value data, wherein said first "1" bit detecting unit includes a first OR gate receiving the least significant bit "$b_N$" of said N-bit data and a second least significant bit "$b_{(N-1)}$" of said N-bit data more significant than the least significant bit "$b_N$" by one digit, and a second OR gate receiving an output of said first OR gate and a third least significant bit "$b_{(N-2)}$" of said N-bit data more significant than said second least significant bit "$b_{(N-1)}$" by one digit, wherein said sign discriminating unit includes a first AND gate receiving the least significant bit "$b_N$" and the most significant bit "$b_1$" of said N-bit data, a second AND gate receiving said output of said first OR gate and the most significant bit "$b_1$" of said N-bit data, and a third AND gate receiving an output of said second OR gate and the most significant bit "$b_1$" of said N-bit data, and wherein said data processing unit includes a first exclusive-OR gate, receiving said second least significant bit "$b_{(N-1)}$" of said N-bit data and an output of said first AND gate, for outputting a second least significant bit "$B_{(N-1)}$" of said absolute value data more significant than the least significant bit "$B_N$" of said absolute value data by one digit, a second exclusive-OR gate, receiving said third least significant bit "$b_{(N<2)}$" of said N-bit data and an output of said second AND gate, for outputting a third least significant bit "$B_{(N-2)}$" of said absolute value data more significant than said second least significant bit "$B_{(N-1)}$" of said absolute value data by one digit, and a third exclusive-OR gate, receiving a fourth least significant bit "$b_{(N-3)}$" of said N-bit data more significant than said third least significant bit "$b_{(N-2)}$" by one digit, and an output of said third AND gate, for outputting a fourth least significant bit "$B_{(N-3)}$" of said absolute value data more significant than said third significant bit "$B_{(N-2)}$" of said absolute value data by one digit.

3. An absolute value circuit claimed in claim 1 wherein said N-bit data is composed of bits "$b_1$" to "$b_N$" where "$b_1$" is the most significant bit and "$b_N$" is the least significant bit, and said absolute value data is composed of bits "$B_1$" to "$B_N$" in the form of a 2's complement where "$B_1$" is the more significant bit and "$B_N$" is the least significant bit, the least significant bit "$b_N$" of said N-bit data being outputted as the least significant bit "$B_N$" of said absolute value data, wherein said sign discriminating unit includes a first exclusive-OR gate receiving the most significant bit "$b_1$" and the least significant bit "$b_N$" of said N-bit data, a second exclusive-OR gate receiving the most significant bit "$b_1$" of said N-bit data and a second least significant bit "$b_{(N-1)}$" more significant than the least significant bit "$b_N$" by one digit, and a third exclusive-OR gate receiving the most significant bit "$b_1$" of said N-bit data and a third least significant bit "$b_{(N-2)}$" more significant than said second least significant bit "$b_{(N-1)}$" by one digit, wherein said first "1" bit detecting unit includes a first AND gate receiving the most significant bit "$b_1$" of said N-bit data and an output of said first exclusive-OR gate, a second AND gate receiving an output of said first AND gate and an output of said second exclusive-OR gate, and a third AND gate receiving an output of said second AND gate and an output of said third exclusive-OR gate, and wherein said data processing unit includes a fourth exclusive-OR gate, receiving said output of said second exclusive-OR gate and said output of said first AND gate, for outputting a second least significant bit "$B_{(N-1)}$" of said absolute value data more significant than the least significant bit "$B_N$" of said absolute value data by one digit, and a fifth exclusive-OR gate, receiving said output of said third exclusive-OR gate and said output of said second AND gate, for outputting a third least significant bit "$B_{(N-2)}$" of said absolute value data more significant than said second least significant bit "$B_{(N-1)}$" of said absolute value data by one digit, an output of said third AND gate outputting a fourth least significant bit "$B_{(N-3)}$" of said absolute value data more significant than said third least significant bit "$B_{(N-2)}$" of said absolute value data by one digit.

* * * * *

UNITED STATES PATENT AND TRADEMARK OFFICE
CERTIFICATE OF CORRECTION

PATENT NO. : 5,307,061
DATED : April 26, 1994
INVENTOR(S) : Makato Suzuki

It is certified that error appears in the above-indentified patent and that said Letters Patent is hereby corrected as shown below:

Col. 3, line 49, delete "(N-2)" and insert --(N-3)--.
Col. 9, line 44, after "$b_N$" insert --where "$b_1$"--.

Signed and Sealed this

Twenty-seventh Day of September, 1994

Attest:

BRUCE LEHMAN

Attesting Officer   Commissioner of Patents and Trademarks